(12) United States Patent
Chen

(10) Patent No.: US 6,906,554 B1
(45) Date of Patent: Jun. 14, 2005

(54) PIPELINE-BASED CIRCUIT WITH A POSTPONED CLOCK-GATING MECHANISM FOR REDUCING POWER CONSUMPTION AND RELATED DRIVING METHOD THEREOF

(75) Inventor: Chung-Hui Chen, Hsin-Chu Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 7 days.

(21) Appl. No.: 10/707,455

(22) Filed: Dec. 16, 2003

(51) Int. Cl.$^7$ ............................. H03K 19/00; G06F 1/32
(52) U.S. Cl. ........................... 326/93; 326/86; 713/322; 713/600; 327/141
(58) Field of Search ............................. 326/93–98, 86, 326/90; 327/141; 713/300, 320, 322, 600, 601

(56) References Cited

U.S. PATENT DOCUMENTS

| | | | | |
|---|---|---|---|---|
| 5,918,042 | A | * 6/1999 | Furber | 713/600 |
| 6,204,695 | B1 | * 3/2001 | Alfke et al. | 326/93 |
| 6,594,815 | B2 | * 7/2003 | Lee et al. | 716/18 |
| 6,609,209 | B1 | * 8/2003 | Tiwari et al. | 713/322 |
| 2004/0130927 | A1 | * 7/2004 | Schulz et al. | 365/145 |
| 2004/0170070 | A1 | * 9/2004 | Rapp et al. | 365/200 |

* cited by examiner

Primary Examiner—Vibol Tan
(74) Attorney, Agent, or Firm—Winston Hsu (57) ABSTRACT

A pipeline-based circuit with a postponed clock-gating mechanism and related driving method are disclosed for reducing power consumption, and the driving method does not deteriorate processing performance of the pipeline-based circuit. A pipeline-based circuit has a plurality of logic operators cascaded to form at least a pipeline, a pipeline control unit for generating at least a control signal to each logic operator for controlling whether one logic operator needs to pipe data to next logic operator, and a control value calculator for setting a valid bit of each logic operator following a currently activated logic operator according to the control signals generated from the pipeline control unit. When each logic operator begins operating, the related control value is used to determine whether or not a clock signal piping data of the present logic operator to next logic operator is gated to reduce power consumption. This postponed clock-gating mechanism avoids the degradation of pipeline clock speed limitation.

27 Claims, 6 Drawing Sheets

PIPELINE-BASED CIRCUIT WITH A POSTPONED CLOCK-GATING MECHANISM FOR REDUCING POWER CONSUMPTION AND RELATED DRIVING METHOD THEREOF

BACKGROUND OF INVENTION

1. Field of the Invention

The present invention relates to a pipeline-based circuit. In particular, the present invention discloses a pipeline-based circuit utilizing a postponed clock-gating mechanism for reducing power consumption.

2. Description of the Prior Art

An accurate clock signal is a key factor for a logic circuit to perform a correct logic operation. That is, the clock signal is used to drive kernel circuit units such as counters and registers within the logic circuit, and a stable clock signal such as a clock signal generated from a crystal oscillator always functions as a reference clock to arbitrate operations of the circuit units within the logic circuit. However, all of the circuit units within the logic circuit are not always active. When some of the circuit units enter an idle mode, these idle circuit units do not need to be driven by the clock signal continuously for performing related operations. If the clock signal is still inputted into the idle circuit units, power consumption of the logic circuit is increased unnecessarily. It is well known that the power consumption of the logic circuit is mainly generated from delivering the clock signal to these circuit units and enabling these circuit units to run related logic operations. In order to reduce power consumption of the logic circuit such as a microprocessor, the clock signals are gated from triggering the idle circuit units. Therefore, unwanted power consumption is accordingly eliminated. In other words, the clock signal transferred to an idle circuit unit is first converted to be one signal with a fixed logic value ("1" or "0"). Taking a clock signal that is a square wave for example, the logic value "1" corresponding to a high voltage and the logic value "0" corresponding to a low voltage are alternatively switched. The clock signal is gated after the clock signal is converted to hold either the logic value "1" or the logic value "0". Because the logic circuit drives one internal circuit unit through a converted clock signal holding a fixed logic value, the operation associated with the circuit unit is blocked. Therefore, the total power consumption of the logic circuit is further reduced. The above-mentioned process is a well-known clock-gating mechanism.

Figure 1:
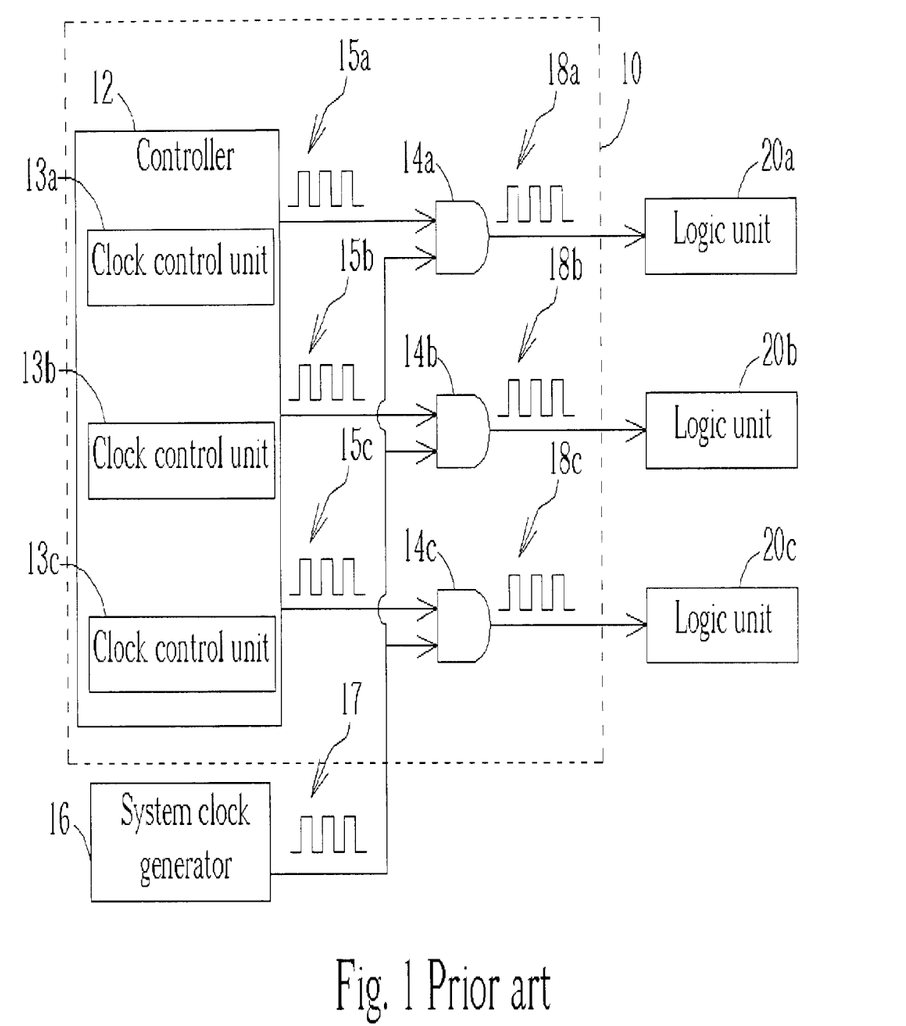
FIG. 1 is a schematic diagram of a prior clock-gating circuit.
Figure 2:
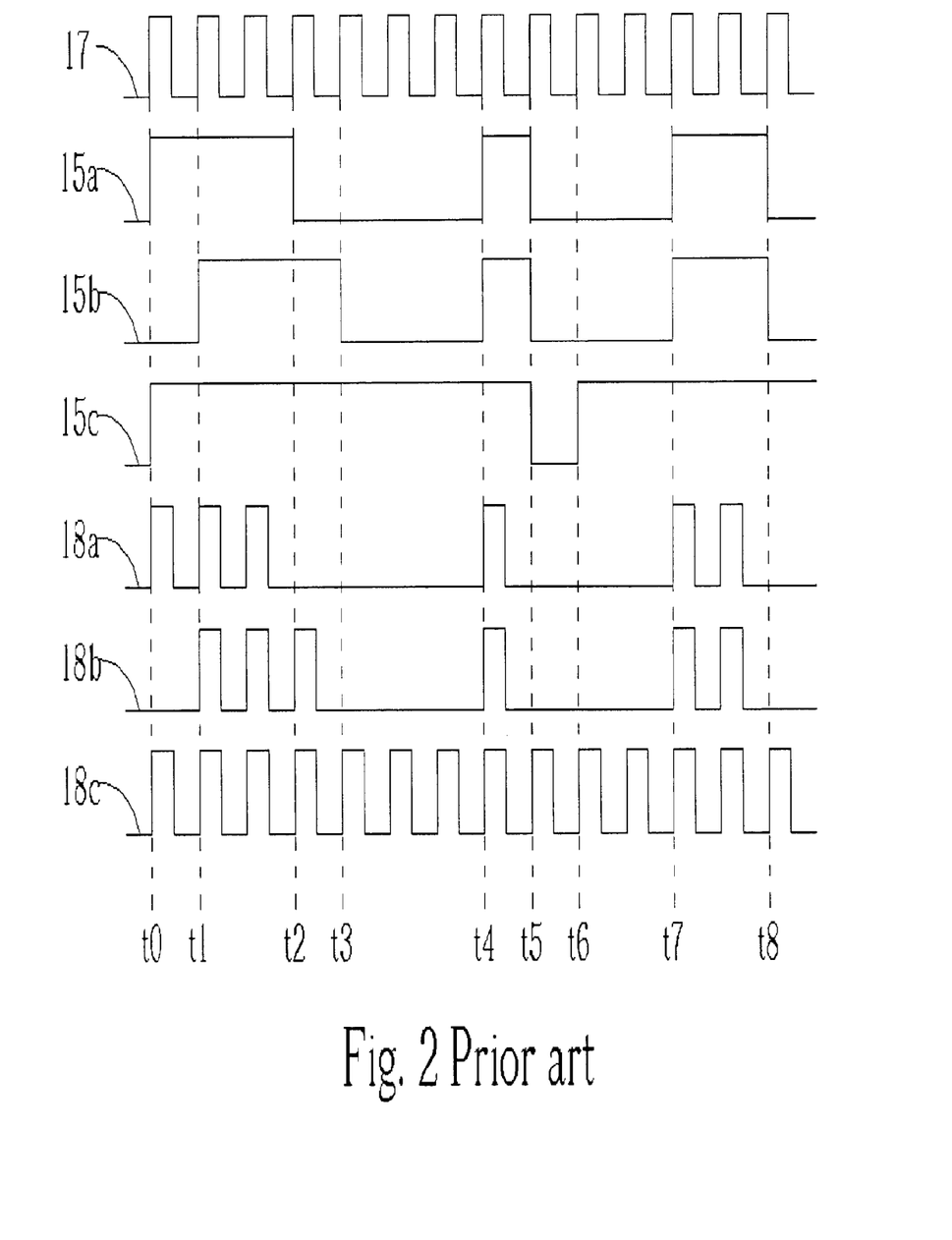
FIG. 2 is a timing diagram of signals of the clock-gating circuit shown in FIG. 1.

Please refer to FIG. 1 and FIG. 2. FIG. 1 is a schematic diagram of a prior clock-gating circuit 10, and FIG. 2 is a timing diagram of signals of the clock-gating circuit 10 shown in FIG. 1. The clock-gating circuit 10 has a controller 12 and a plurality of logic gates 14a, 14b, 14c. Each of the logic gates 14a, 14b, 14c performs the AND logic operation. The controller 12 includes a plurality of clock control units 13a, 13b, 13c respectively used for generating control signals 15a, 15b, 15c to corresponding logic gates 14a, 14b, 14c. In addition, a system clock generator 16 is capable of generating a clock signal 17 to the logic gates 14a, 14b, 14c. Then, the logic gates 14a, 14b, 14c respectively output clock-gating output signals 18a, 18b, 18c to corresponding logic units 20a, 20b, 20c. The above clock-gating output signals 18a, 18b, 18c are used to drive the logic units 20a, 20b, 20c.

When the logic unit 20a enters the idle mode, the clock control unit 13a is activated to gate the clock signal 17 through the control signal 15a. Please refer to FIG. 2. During a period t0~t2, the control signal 15a holds the logic value "1" corresponding to a high voltage. Therefore, the clock signal 17 successfully passes through the logic gate 14a. That is, the waveform of the clock-gating output signal 18a is identical to the waveform of the clock signal 17, and the clock-gating output signal 18a drives the running logic unit 20a successfully. However, when the logic unit 20a does not need to be activated during a period t2~t4, the clock control unit 13a outputs the control signal 15a with the logic value "0" corresponding to a low voltage. The clock signal 17 is gated through the logic gate 14a. That is, the clock-gating output signal 18a holds the constant logic value "0" during the period t2~t4, and the operation of the logic unit 20a is interrupted to reduce power consumption. During a period t4~t5 and a period t7~t8, the control signal 15a corresponds to the logic value "1" so that the clock signal 17 is inputted into the logic unit 20a again. During a period t5~t7, the logic unit 20a does not need to be activated. Therefore, the control signal 15a then corresponds to the logic value "0" to gate the clock signal 17 from driving the logic unit 20a for reducing power consumption.

Similarly, with regard to other logic units 20b, 20c, the clock control units 13b, 13c output the control signals 15b, 15c corresponding to the logic value "0" to gate the clock signal 17 through the logic gates 14b, 14c when the logic units 20b, 20c do not need to be activated. For the logic unit 20b, the clock control unit 13b gates the clock signal 17 to reduce power consumption during periods t0~t1, t3~t4, t5~t7. For the logic unit 20c, the clock control unit 13c gates the clock signal 17 to reduce power consumption during a period t5~t6. Please note that the operations associated with the logic units 20b, 20c are not repeated for simplicity.

For the logic circuit, a pipeline structure, generally speaking, is adopted to improve processing efficiency. Please refer to FIG. 3, which is a block diagram of a prior art pipeline-based circuit 30. The pipeline-based logic circuit 30 includes a plurality of processing units 32a, 32b, 32c, a pipeline control unit 34, and a clock-gating unit 36. Each of the processing units 32a, 32b, 32c includes a logic unit 38a, 38b, 38c and a buffer unit 40a, 40b, 40c. The logic units 38a, 38b, 38c are used to perform predetermined logic operations respectively. For example, the logic unit 38a, 38b, or 38c can be an adder for doing binary addition or a multiplier for doing binary multiplication.

Figure 3:
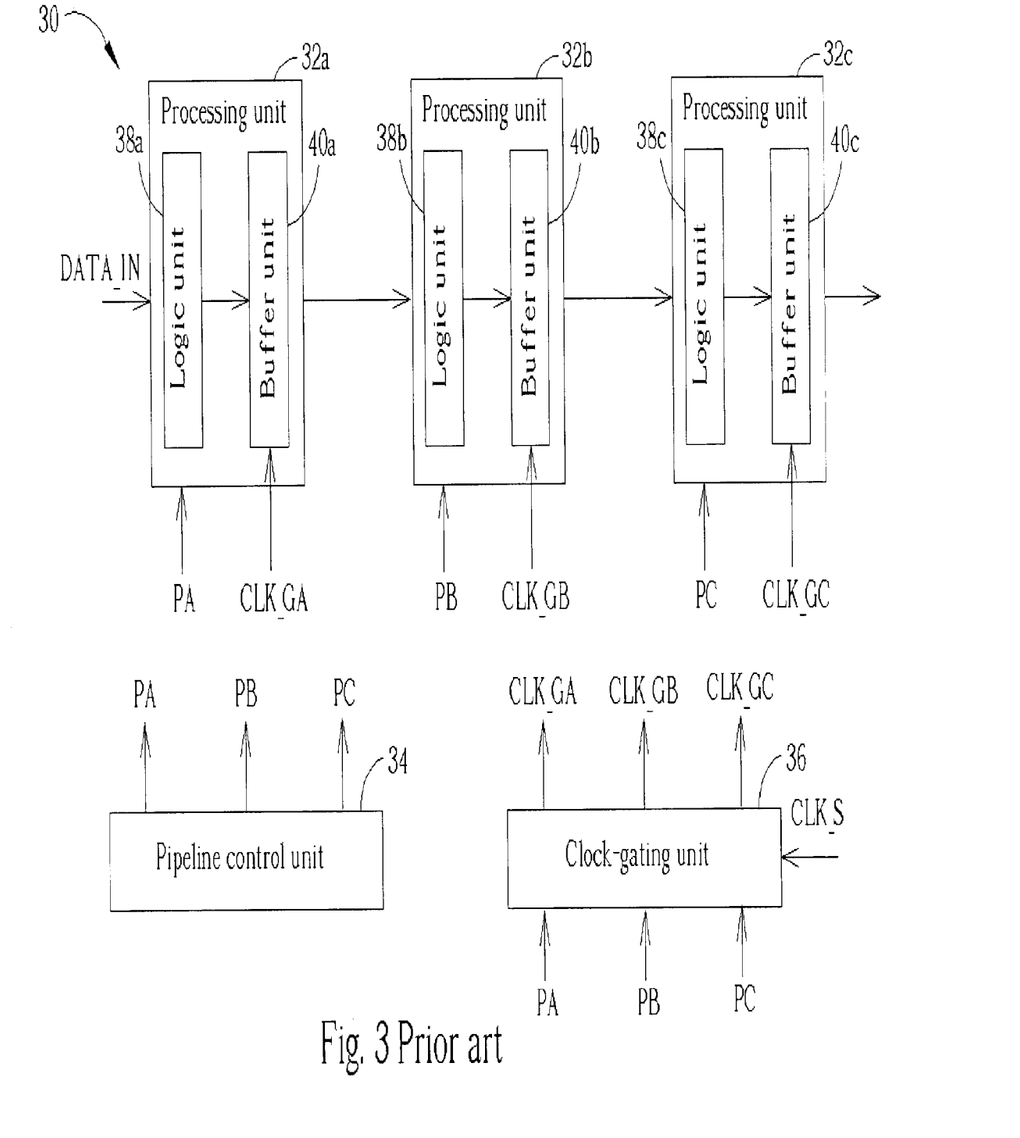
FIG. 3 is a block diagram of a prior art pipeline-based circuit.

The buffer units 40a, 40b, 40c corresponding to the logic units 38a, 38b, 38c are used to store calculation results outputted from the logic units 38a, 38b, 38c. Then, a calculation result currently stored in one logic unit is passed to a logic unit next to the current logic unit. The buffer units 40a, 40b, 40c can be prior art flip-flops. If the logic unit 38a is used to output a calculation result having a bit length equaling 64, the buffer unit 40 needs 64 flip-flops to store the calculation result. In addition, one clock signal is necessary for controlling the buffer units 40a, 40b, 40c to store the calculation results generated from the logic units 38a, 38b, 38c and controlling the buffer units 40a, 40b, 40c to output the stored calculation results.

The pipeline control unit 34 is used to control the operation of the pipeline established by the processing units 32a, 32b, 32c. As shown in FIG. 3, the pipeline control unit 34 is capable of outputting control signals PA, PB, PC to control the processing units 32a, 32b, 32c. For example, an input data DATA_IN is inputted into the processing unit 32a. Therefore, the logic unit 38a starts processing the input data DATA_IN according to a predetermined logic operation. After the predetermined logic operation is done, the pipeline control unit 34 generates the control signal PA according to current operating modes of the logic units 32a, 32b, 32b, and outputs the control signal PA to the logic unit 32a for activating the buffer unit 40a to store a calculation result generated from the logic unit 32a. At the same time, the stored calculation result is passed to the next logic unit 32b. As mentioned above, one of the logic units 32a, 32b, 32c in the pipeline-based logic circuit 30 may not be used to process the input data DATA_IN. For example, after the input data DATA_IN has been processed by the logic units 32a, 32b, a branch may occur to terminate the process for the input data DATA_IN. Therefore, the logic unit 32b does not need to pass its calculation result to the next logic unit 32c for following operations. For the input data DATA_IN, any logic units following the logic unit 32b do not need to be activated. In other words, the related buffer units do not need to transfer calculation results stage by stage. Therefore, a prior art clock-gating mechanism can be adopted to reduce power consumption of the inactive buffer units.

The clock-gating unit 36 is used to control the clock signals inputted into the buffer units 40a, 40b, 40c positioned in the corresponding processing units 32a, 32b, 32c to achieve the goal of saving power. Generally speaking, the clock-gating unit 36 generates the clock signals CLK_GA, CLK_GB, CLK_GC inputted to the buffer units 40a, 40b, 40c according to a system clock CLK_S and the control signals PA, PB, PC generated from the pipeline control unit 34. The control signals PA, PB, PC are determined according to predetermined conditions. For instance, data transmission statuses associated with a bus and operating statuses of logic units function as the predetermined condition used by the pipeline control unit 34 to output the control signal PB. Please note that the predetermined conditions for the processing units 32a, 32b, 32c may differ from each other. For example, each of the control signals PA, PB, PC comprises a piping enable signal for driving a corresponding logic unit to pipe its calculation result to the next logic unit, and a piping flush signal for nullifying the calculation result generated by the corresponding logic unit. Concerning the logic unit 32b, suppose that the control signal PB itself is a piping enable signal, and corresponds to three conditions A, B, C. That is, the three conditions A, B, C are used to determine whether the piping enable signal is outputted to make the processing unit 32b pipe its calculation result to the next processing unit 32c. The conditions A, B, C are related to the operating statuses of the logic units 32a, 32b, 32c, and the pipeline control unit 34 only uses the conditions A, B, C to set the control signal PB corresponding to the logic unit 32b. The pipeline control unit 34 is capable of determining if the piping enable signal is outputted to the logic unit 32b after the conditions A, B, C have been successfully determined. Therefore, the pipeline control unit 34 needs to wait until all of the conditions A, B, C are determined. That is, the pipeline control unit 34 has to wait a longer period of time before generating the piping enable signal for the processing unit 32b. When the control signal PB is used to drive the prior art clock-gating mechanism, the above-mentioned delay time actually affects the operation of the clock-gating unit 36. The reason is described as follows.

Figure 4:
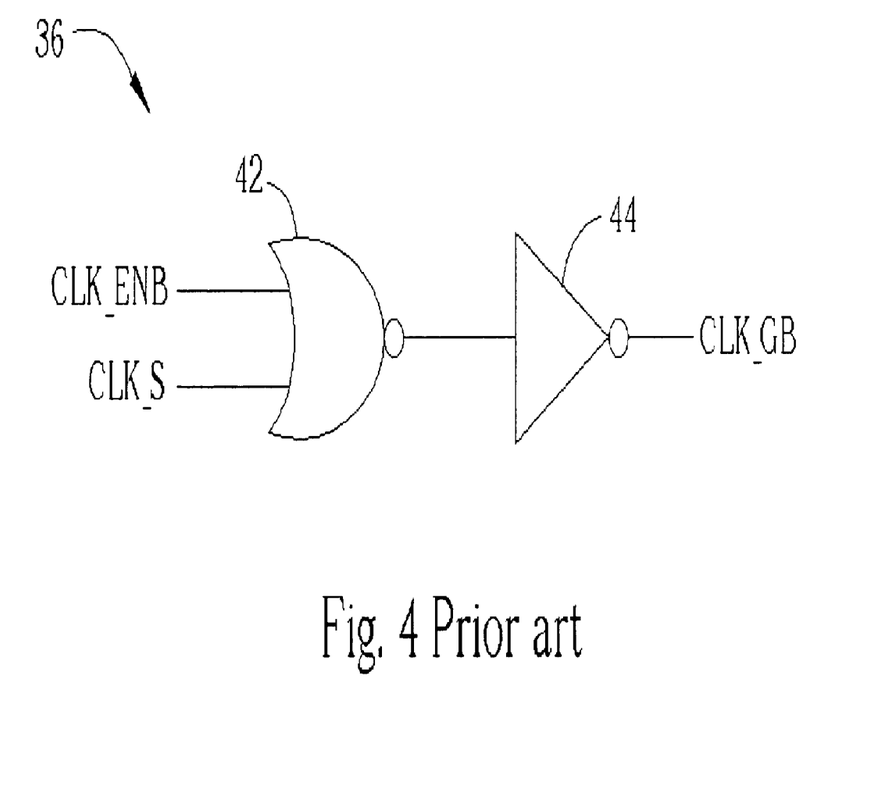
FIG. 4 is a schematic diagram of a clock-gating unit shown in FIG. 3.
Figure 5:
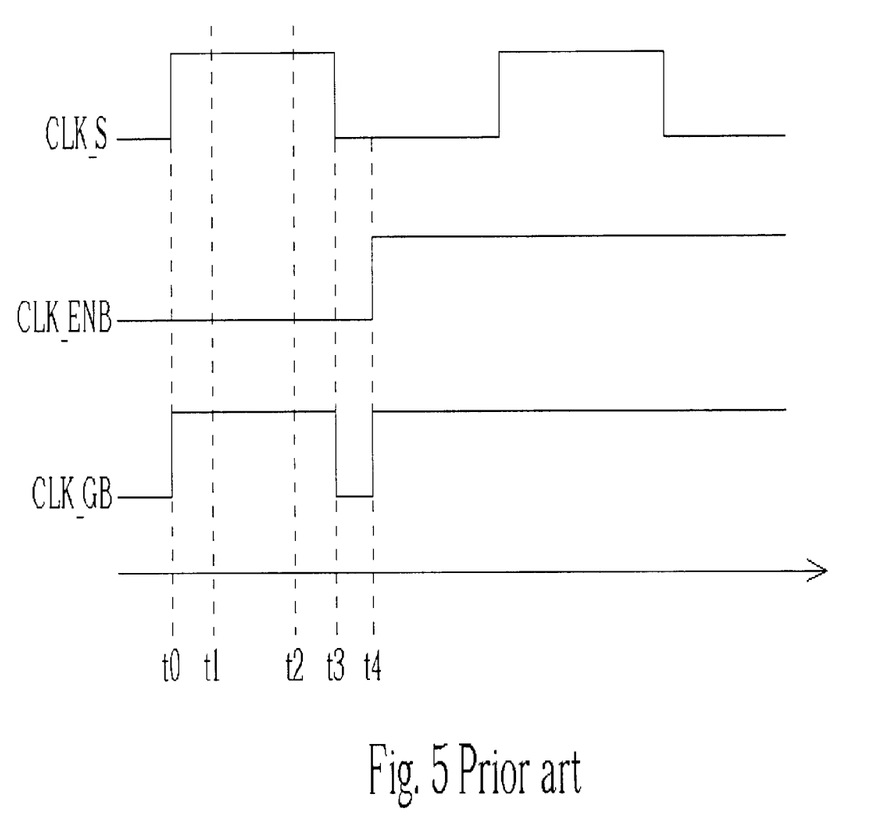
FIG. 5 is a timing diagram of signals of the clock-gating unit shown in FIG. 3.

Please refer to FIG. 4 and FIG. 5. FIG. 4 is an example schematic diagram of the clock-gating unit 36 shown in FIG. 3, and FIG. 5 is a timing diagram of signals running in the clock-gating unit 36 shown in FIG. 3. The clock-gating unit 36 has a logic gate 42 and an inverter 44. The logic gate 44 performs an NOR logic operation upon the clock control signal CLK_ENB and the clock signal CLK_S to generate the clock signals CLK_GA, CLK_GB, CLK_GC for the processing units 32a, 32b, 32c. The clock control signal CLK_ENB is generated from a predetermined logic operation upon the piping enable signal and the pipeline flush signal of each processing unit 32a, 32b, 32c. For example, suppose that the clock control signal CLK_ENB for the processing unit 32b is determined by the piping enable signal only. As mentioned above, when all of the conditions A, B, C correspond to the logic value "1", the clock control signal CLK_ENB is set by the logic value "1" at t4. As shown in FIG. 5, the clock control signal CLK_ENB does not have a transition from the logic value "0" to the logic value "1" until t4. With the processing performed by the clock-gating unit 36, the clock signal CLK_GB has a falling edge at t3, and corresponds to the logic value "0" during a period t3~t4. Then, the clock signal CLK_GB has a rising edge at t4, and the clock signal CLK_GB holds the logic value "1" after t4. If the processing unit 32b connected to the clock-gating unit 36 is triggered by rising edges of the clock signal CLK_GB, the clock-gating unit 36 should make the clock signal CLK_GB hold the logic value "1" after t0 to gate the clock signal CLK_S. However, because the clock control signal CLK_ENB is late-arrived as shown in FIG. 5, the processing unit 32b is triggered twice respectively at t0 and t4. In other words, the clock signal CLK_GB leaves the logic value "0" at t4. Therefore, the clock signal CLK_GB having the rising edge at t4 is capable of triggering the processing unit 32b, and as such, the clock signal CLK_GB cannot achieve the goal of reducing power consumption.

Furthermore, a glitch is induced to affect the operation of the processing unit 32b. According to the prior art, the period t0~t1 is defined to be a clock-gating hold time, and the period t2~t3 is defined to be a clock-gating setup time. In other words, the clock control signal CLK_ENB needs to be inputted before a falling edge of the clock signal CLK_S. Otherwise, the clock signal CLK_GB generates the unwanted glitch during the period t3~t4. The unwanted glitch induced for each of the clock signals CLK_GA, CLK_GB, CLK_GC likely results in the pipeline-based logic circuit 30 functioning incorrectly.

SUMMARY OF INVENTION

It is therefore a primary objective of this invention to provide a pipeline-based circuit utilizing control values to control the operation of the clock-gating mechanism so that whether or not a clock signal is gated is predetermined by the control values before each stage of the pipeline-based circuit starts working.

Briefly summarized, the preferred embodiment of the present invention discloses a pipeline-based circuit. The pipeline-based circuit has a plurality of logic operators cascaded to form at least a pipeline, a pipeline control unit for generating at least a control signal to each logic operator for controlling whether one logic operator needs to pipe data to a next logic operator, and a control value calculator for setting a control value of each logic operator following a currently activated logic operator according to the control signals generated from the pipeline control unit. When each logic operator begins operating, the related control value is used to determine whether or not a clock signal piping data of the present logic operator to the next logic operator is gated to reduce power consumption.

It is an advantage of the present invention that the claimed pipeline-based circuit can prevent the possibly late-arrived control signal from affecting the operation of the clock-gating unit. That is, the claimed pipeline-based circuit is capable of gating clock signals in time for saving power successfully. In addition, the claimed pipeline-based circuit needs to implement additional second buffer units only. The circuit structure of the second buffer unit is simple, and the implementation is straightforward. Therefore, the control values can be easily applied to pipeline-based circuits having different pipeline structures for accomplishing the same purpose of reducing power consumption. In addition, the postponed clock-gating mechanism avoids the degradation of pipeline clock speed.

These and other objectives of the present invention will no doubt become obvious to those of ordinary skill in the art after reading the following detailed description of the preferred embodiment, which is illustrated in the various figures and drawings.

DETAILED DESCRIPTION

Figure 6:
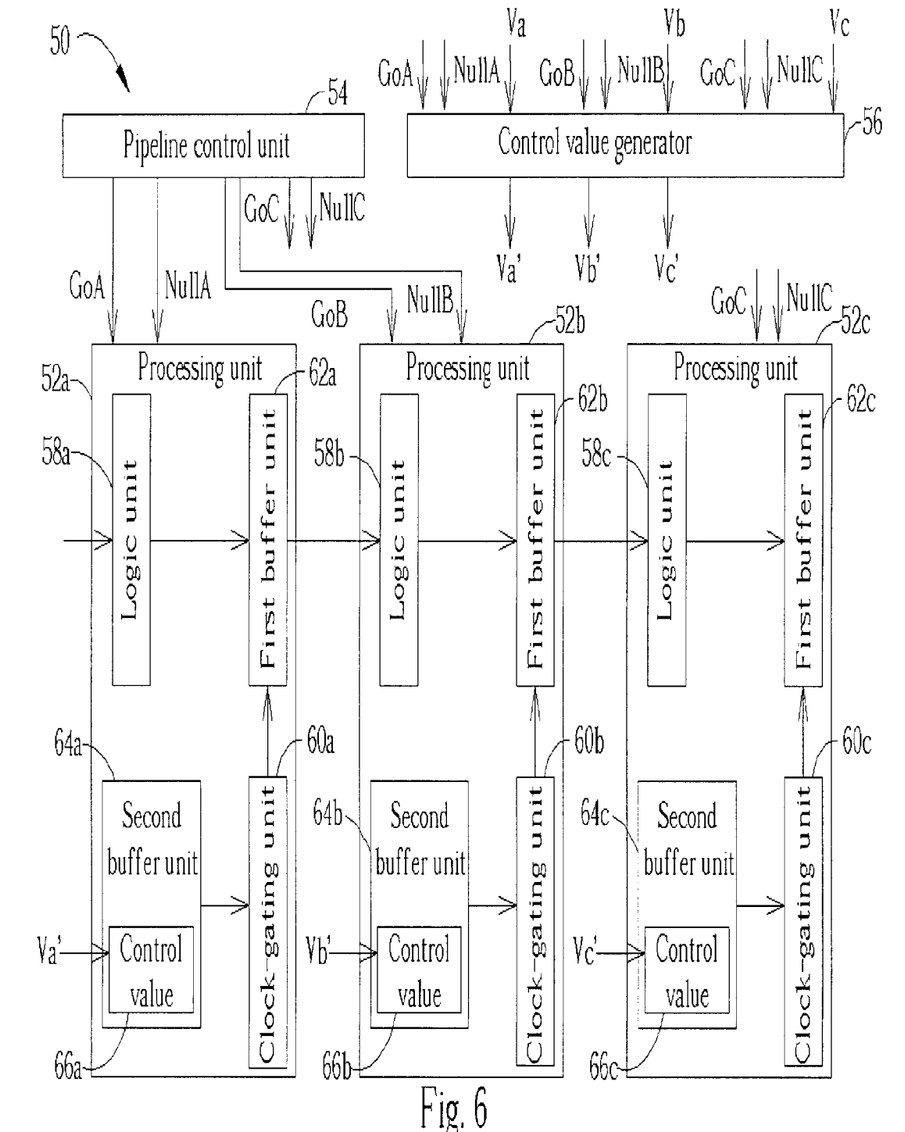
FIG. 6 is a block diagram of a pipeline-based circuit according to the present invention.

Please refer to FIG. 6, which is a block diagram of a pipeline-based circuit 50 according to the present invention. The pipeline-based circuit 50, which can be a microprocessor or a digital signal processor (DSP), has a plurality of processing units 52a, 52b, 52c, a pipeline control unit 54, and a control value generator 56. The processing units 52a, 52b, 52c are cascaded to establish a pipeline. Each of the processing units 52a, 52b, 52c has a logic unit 58a, 58b, 58c, a clock-gating unit 60a, 60b, 60c, a first buffer unit 62a, 62b, 62c, and a second buffer unit 64a, 64b, 64c. Taking the processing unit 52a for example, the logic unit 58a is used to perform a predetermined logic operation such as addition or multiplication. The first buffer unit 62a is used to store a calculation result outputted from the logic unit 58a, and to pass the stored calculation result to the next processing unit 52b. The clock-gating unit 60 is used to control a clock signal inputted into the first buffer unit 62a according to an operating status (an "active" mode or an "idle" mode) of the first buffer unit 62a. If the first buffer unit 62a does not need to be driven by the clock signal, the clock signal is gated for reducing power consumption. In the preferred embodiment, the second buffer units 64a, 64b, 64c store control values 66a, 66b, 66c respectively, and the control values 66a, 66b, 66c are used for controlling the clock-gating units 60a, 60b, 60c to gate clock signals inputted into the first buffer units 62a, 62b, 62c. In addition, the pipeline control unit 54 outputs control signals GOA, GOB, GOC, NullA, NullB, NullC for controlling operations of the processing units 52a, 52b, 52c. For instance, when the pipeline control unit 54 delivers the control signal GOA to the processing unit 52a, it means that the calculation result of the logic unit 58a needs to be piped to the next processing unit 52b. However, if the pipeline control unit 54 outputs the control signal NullA to the processing unit 52a, it means that the calculation result generated from the logic unit 58a needs to be nullified. Similarly, the control signals GOB, GOC, NullB, NullC perform the same operation mentioned above, and repeated description is omitted for conciseness. The preferred embodiment, therefore, sets the control values 66a, 66b, 66c according to the control signals GOA, GOB, GOC, NullA, NullB, NullC corresponding to the processing units 52a, 52b, 52c. That is, the control value generator 56 generates the control signals Va", Vb", Vc" respectively to set corresponding control values 66a, 66b, 66c. Please note that the control signals Va", Vb", Vc" represent the updated control signals Va, Vb, Vc for setting the control values 66a, 66b, 66c. The detailed operation related to controlling the first buffer units 62a, 62b, 62c through the control values 66a, 66b, 6c inputted into corresponding clock-gating units 60a, 60b, 60c is described as follows.

In the preferred embodiment, the clock-gating units 60a, 60b, 60c do not gate the clock signals generated by a clock generator from being inputted into corresponding first buffer units 62a, 62b, 62c if the control values 66a, 66b, 66c hold the logic value "1". On the contrary, the clock-gating units 60a, 60b, 60c gate the clock signals from being inputted into corresponding first buffer units 62a, 62b, 62c for reducing power consumption if the control values 66a, 66b, 66c hold the logic value "0". Please note that the first buffer units 62a, 62b, 62c and the second buffer units 64a, 64b, 64c in the preferred embodiment are built using flip-flops, and the first buffer units 62a, 62b, 62c and the second buffer units 64a, 64b, 64c can store data or output data according to the received clock signals. The circuit structures of the clock-gating units and the flip-flops are well known, and the lengthy description is skipped for simplicity. In addition, the first buffer units 62a, 62b, 62c and the second buffer units 64a, 64b, 64c can be implemented by other circuits capable of storing data and outputting data.

Suppose that the logic value "1" has been assigned to the control values 66a, 66b, 66c in the processing units 52a, 52b, 52c through the control signals Va", Vb", Vc". Therefore, the clock signals are passed to the first buffer units 62a, 62b, 62c through the clock-gating units 60a, 60b, 60c for driving the logic units 58a, 58b, 58c to generate calculation results respectively. Then, the pipeline control unit 54 starts setting logic values of the control signals GOA, GOB, GOC, NullA, NullB, NullC according to the defined rules for the processing units 52a, 52b, 52c. In the preferred embodiment, the control value. generator 56 generates the control signals Va", Vb", Vc" for updating the control values of the processing units 52a, 52b, 52c according to the control signals GOA, GOB, GOC, NullA, NullB, NullC, Va, Vb, Vc. The control signals Va, Vb, Vc inputted into the control value generator 56 represent the control values 66a, 66b, 66c currently stored in the second buffer units 64a, 64b, 64c, and the control signal Va", Vb", Vc", outputted from the control value generator 56 are used to update the control values 66a, 66b, 66c currently stored in the second buffer units 64a, 64b, 64c. In other words, the control signals Va, Vb, Vc and the control signals Va", Vb", Vc" are identical. However, the control signals Va, Vb, Vc and the control signals Va", Vb", Vc" respectively represent the current control values and the next control values.

For the control value 66b of the processing unit 52b, the rules for determining the control signal Vb" are listed below.

Rule (1): if Va=1 & GOA & !NullA, Vb=1
Rule (2): if Vb=1 & !GOA & !GOB & !NullB, Vb"=1
Rule (3): if GOA & NullA, Vb=0
Rule (4): if !GOA & GOB, Vb"=0
Rule (5): if Va=0 & GOA, Vb"=0

The above rules are described as follows. For the rule (1), the control value 66a holds the logic value "1" so that the clock signal is successfully inputted into the first buffer unit 62a. Therefore, the first buffer unit 62a functions normally owing to the operative clock signal. In addition, the pipeline control unit 54 outputs the control signal GOA to the processing unit 52a for making the processing unit 52a pipe the calculation result to the next processing unit 52b. At this time, the pipeline control unit 54 does not output the control signal NullA to the processing unit 52a yet for making the processing unit 52a nullify the calculation result. Therefore, the control value 66b is set to the logic value "1". In other words, the following first buffer unit 62b is enabled to start working according to the rule (1).

For the rule (2), the control value 66b holds the logic value "1" so that the clock signal is successfully inputted into the first buffer unit 62b. Now, the first buffer unit 62b functions normally owing to the operative clock signal. In addition, the pipeline control unit 54 does not output the control signal GOA to the processing unit 52a yet for making the processing unit 52a pipe the calculation result to the next processing unit 52b, and the pipeline control unit 54 does not output the control signal GOB to the processing unit 52b yet for making the processing unit 52b pipe the calculation result to the next processing unit 52c. At the same time, the pipeline control unit 54 does not output the control signal NullB to the processing unit 52b for making the processing unit 52b nullify the calculation result. Therefore, the control value 66b is not modified, and still keeps the original logic value "1".

For the rule (3), the pipeline control unit 54 outputs the control signal NullA to the processing unit 52a for nullifying the calculation result of the processing unit 52a. That is, the output data of the logic unit 58a is cleared. At the same time, the pipeline control unit 54 generates the control signal GOA for driving the processing unit 52a to pipe the calculation result to the next processing unit 52b. It is noteworthy that the calculation result of the processing unit 52a has been nullified. Therefore, the data inputted into the logic unit 58b is not valid, and the processing unit 52b does not need to activate the first buffer unit 62b for piping the calculation result of the logic unit 58b to the next processing unit 52c. The logic value "0" is assigned to the control value 66b so that the clock-gating unit 60b gates the clock signal from being inputted into the first buffer unit 62b.

For the rule (4), the pipeline control unit 54 outputs the control signal GOB to the processing unit 52b for controlling the processing unit 52b to pipe the calculation result to the next processing unit 52c. However, the pipeline control unit 54 does not output the control signal GOA to the processing unit 52a yet. Therefore, the logic unit 58b of the processing unit 52b does not receive any input data used for calculating the calculation result, and no calculation result needs to be passed to the next processing unit 52c through the first buffer unit 62b. The logic value "0" is then assigned to the control value 66b so that the clock-gating unit 60b gates the clock signal from being inputted into the first buffer unit 62b. In other words, the first buffer unit 62 is unable to output any valid data to the processing unit 52c.

For the rule (5), the clock signal originally inputted into the first buffer unit 62a is gated because the control value 66a currently holds the logic value "0". Therefore, the first buffer unit 62a is unable to function normally for piping the calculation result of the processing unit 52a to the next processing unit 52b. Even though the pipeline control unit 54 outputs the control signal GOA to the processing unit 52a, the processing unit 52a is still unable to pipe its calculation result to the next processing unit 52b. Concerning the processing unit 52b, the processing unit 52b does not receive any valid input data for the logic unit 58b. The first buffer unit 62b of the processing unit 52b, therefore, does not need to be driven by the clock signal for piping the calculation result of the logic unit 58b to the processing unit 52c. The logic value "0" is then assigned to the control value 66b.

The control values 66a, 66b, 66c of the processing units 52a, 52b, 52c hold either the logic value "1" or the logic value "0" according to the above-listed rules. From the above description, the control value 66c of the processing unit 52c following the processing unit 52b must correspond to the logic value "0" through the rule (5) after the control value 66b of the processing unit 52b is set to the logic value "0" through the rule (3), the rule (4), or the rule (5). Therefore, when the processing unit 52c starts working, the control value 66c drives the clock-gating unit 60c to gate the clock signal from being inputted into the first buffer unit 62c.

In the preferred embodiment, the second buffer units 64a, 64b, 64c also need to be driven by clock signals for storing control values 66a, 66b, 66c and outputting the control values 66a, 66b, 66c to corresponding clock-gating units 60a, 60b, 60c. Though the second buffer units 64a, 64b, 64c are added to the processing units 52a, 52b, 52c to keep the control values 66a, 66b, 66c used for controlling clock signals inputted into the first buffer units 62a, 62b, 62c. Compared with the power consumption of a system clock generator continuously outputting clock signals to drive the idle first buffer units 62a, 62b, 62c, the power consumption of the system clock generator continuously outputting the clock signals to drive the second buffer units 64a, 64b, 664 is negligible. For example, the logic unit 58 generates the calculation result having a bit length equaling 64. The first buffer unit 62a, therefore, requires 64 flip-flops to handle the calculation result correctly. However, only one flip-flop is needed to keep the control value 66a. To sum up, the preferred embodiment having these additional second buffer units 64a, 64b, 64c does not greatly raise the power consumption of the system clock generator. Actually, the preferred embodiment not only reduces the power consumption, but also allows operation of the clock-gating unit to conform to the limitation of the well-known clock-gating setup time.

In addition, the preferred embodiment uses the control values 66a, 66b, 66c to drive the clock-gating units 60a, 60b, 60c. The control value 66c of the processing unit 52c following the processing unit 52b certainly corresponds to the logic value "0" through the rule (5) after the control value 66b of the processing unit 52b is set to the logic value "0" through the rule (3), the rule (4), or the rule (5). Therefore, when the processing unit 52c starts working, the control value 66c drives the clock-gating unit 60c to gate the clock signal from being inputted into the first buffer unit 62c. In other words, the power consumption of the system clock generator is quickly reduced when the processing unit 52c starts working. The time wasted for waiting a pipeline control unit of a running prior processing unit to finish delivering a wanted control signal to a clock-gating unit for gating a clock signal is cut down now with the help of the claimed control values. That is, with the implementation of the control values, the preferred embodiment is capable of transmitting the control values to the clock-gating units when the corresponding processing units start working. Therefore, the preferred embodiment can prevent the control signal delayed by the pipeline control unit from affecting the operation of the clock-gating unit. That is, the preferred embodiment is capable of gating clock signals correctly for saving power, and is capable of effectively improving cycle time of the pipeline-based circuit 50.

Please note that the preferred embodiment only utilizes one pipeline to illustrate its operation. However, the pipeline-based circuit 50 can be built according to a super-scalar structure or a super-pipeline structure. In addition, the pipeline-based circuit 50 still can utilize the control values to control corresponding clock-gating units. Taking a super-scalar structure with a plurality of pipelines for example, a plurality of processing units are located at each pipeline. Therefore, a plurality of buffer units used for storing control values are then implemented according to a total number of the processing units. With the above-mentioned rules for determining the control values, the control values are capable of achieving the goal of saving power through correctly gating clock signals. To sum up, the claimed control values can be easily implemented on the pipeline-based circuits 50 having different pipeline structures. Therefore, the pipeline-based circuit according to the present invention has great scalability.

In contrast to the prior art, the claimed pipeline-based circuit utilizes second buffer units to store control values used for controlling clock-gating units. When one processing unit does not need to pipe a calculation result to a next stage, the related control value is set by a predetermined logic value so that the clock signal is gated when the processing unit starts working. In other words, after the processing unit starts working, the operation of gating the clock signal for reducing power consumption associated with the clock signal is completed within a prior art clock-gating setup time. Furthermore, when following processing units start working, the corresponding control values are set by the same predetermined value according to the above-mentioned claimed rules for gating the clock signals inputted into the first buffer units of the following processing units. Therefore, the claimed pipeline-based circuit can prevent the late-arrived control signal from affecting the operation of the clock-gating unit. That is, the claimed pipeline-based circuit is capable of gating clock signals in time for saving power successfully. In addition, the claimed pipeline-based circuit only requires additional second buffer units. The circuit structure of the second buffer unit simple, and the implementation is easy. Therefore, the control values can be easily applied to pipeline-based circuits having different pipeline structures for accomplishing the same purpose of reducing power consumption.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pipeline-based circuit comprising:
    a plurality of processing units cascaded to establish at least a pipeline, each processing unit comprising:
    a logic unit for performing a predetermined logic operation;
    a first buffer unit electrically connected to the logic unit for piping an output data of the logic unit to a logic unit of a next processing unit according to a clock signal, the clock signal cyclically transitioning between a first logic value and a second logic value;
    a clock-gating unit electrically connected to the first buffer unit for determining if the clock signal inputted into the first buffer unit is gated according to a control value for making the clock signal correspond to the first logic value when the processing unit starts working; and
    a second buffer unit electrically connected to the clock-gating unit for storing the control value;
    a pipeline control unit for generating at least a control signal to each processing unit for controlling if an output data associated with a processing unit is piped to a next processing unit; and
    a control value generator for setting the control value of each processing unit according to a plurality of control signals outputted from the pipeline control unit.

2. The pipeline-based circuit of claim 1 wherein the first logic value is "0", and the second logic value is "1".

3. The pipeline-based circuit of claim 1 wherein the first buffer unit comprises at least a flip-flop.

4. The pipeline-based circuit of claim 1 wherein the second buffer unit comprises at least a flip-flop.

5. The pipeline-based circuit of claim 1 wherein the pipeline control unit is capable of generating a first control signal to each processing unit for piping the output data of the logic unit to the next processing unit, and is capable of generating a second control signal to each processing unit for nullifying the output data of the logic unit.

6. The pipeline-based circuit of claim 5 wherein when a control value of a first processing unit holds a predetermined value for controlling a clock-gating of the first processing unit not to gate the clock signal, the pipeline control unit does not output the first control signal to a processing unit before the first processing unit, the pipeline control unit does not output the first control signal to the first processing unit, and the pipeline control unit does not output the second control signal to the first processing unit, the control value of the first processing unit is capable of maintaining the predetermined value.

7. The pipeline-based circuit of claim 5 wherein when the pipeline control unit outputs the first control signal and the second control signal to a first processing unit, a control value of a processing unit following the first processing unit is capable of being set to a predetermined value for driving a clock-gating unit of the processing unit following the first processing unit to gate the clock signal.

8. The pipeline-based circuit of claim 5 wherein when the pipeline control unit outputs the first control signal to a first processing unit, and the pipeline control unit does not output the first control signal to a processing unit before the first processing unit, a control value of the first processing unit is capable of being set to a predetermined value for driving a clock-gating unit of the first processing unit to gate the clock signal.

9. The pipeline-based circuit of claim 5 wherein when a control value of a first processing unit holds a predetermined value for driving a clock-gating unit of the first processing unit to gate the clock signal, and the pipeline control unit outputs the first control signal to the first processing unit, a control value of a processing unit following the first processing unit is capable of being set to the predetermined value.

10. The pipeline-based circuit of claim 1 being built according to a super-scalar structure.

11. The pipeline-based circuit of claim 1 being built according to a super-pipeline structure.

12. The pipeline-based circuit of claim 1 being a microprocessor.

13. The pipeline-based circuit of claim 1 being a digital signal processor (DSP).

14. A method of controlling a clock signal for a pipeline-based circuit, the pipeline-based circuit comprising:
    a plurality of processing units cascaded to establish at least a pipeline, each processing unit comprising:
    a logic unit for performing a predetermined logic operation; and a first buffer unit electrically connected to the logic unit for piping an output data of the logic unit to a logic unit of a next processing unit according to a clock signal, the clock signal cyclically transitioning between a first logic value and a second logic value; the method comprising:

installing a clock-gating unit in each processing unit and connecting the clock-gating unit and the first buffer unit for gating the clock signal inputted into the first buffer unit to make the clock signal correspond to the first logic value;

installing a second buffer unit in each processing unit and connecting the second buffer unit and the clock-gating unit for storing the control value;

installing a pipeline control unit for generating at least a control signal to each processing unit to control if an output data associated with a processing unit is piped to a next processing unit;

utilizing a plurality of control signals generated from the pipeline control to set the control value of each processing unit; and utilizing the control value of each processing unit to control if the corresponding clock-gating unit gates the clock signal inputted into the corresponding first buffer unit when each processing unit starts working.

15. The method of claim 14 wherein the first logic value is "0", and the second logic value is "1".

16. The method of claim 14 wherein the first buffer unit comprises at least a flip-flop.

17. The method of claim 14 wherein the second buffer unit comprises at least a flip-flop.

18. The method of claim 14 wherein when the pipeline control unit generates a first control signal to each processing unit, the output data of the logic unit is piped to the next processing unit, and when the pipeline control unit generates a second control signal to each processing unit, the output data of the logic unit is nullified.

19. The method of claim 18 wherein the step of setting the control value of each processing unit comprises:

when a control value of a first processing unit holds a predetermined value for controlling a clock-gating of the first processing unit not to gate the clock signal, the pipeline control unit does not output the first control signal to a processing unit before the first processing unit, the pipeline control unit does not output the first control signal to the first processing unit, and the pipeline control unit does not output the second control signal to the first processing unit, the control value of the first processing unit maintains the predetermined value.

20. The method of claim 18 wherein the step of setting the control value of each processing unit comprises:

when the pipeline control unit outputs the first control signal and the second control signal to a first processing unit, a control value of a processing unit following the first processing unit is set to a predetermined value for driving a clock-gating unit of the processing unit following the first processing unit to gate the clock signal.

21. The method of claim 18 wherein the step of setting the control value of each processing unit comprises:

when the pipeline control unit outputs the first control signal to a first processing unit, and the pipeline control unit does not output the first control signal to a processing unit before the first processing unit, a control value of the first processing unit is set to a predetermined value for driving a clock-gating unit of the first processing unit to gate the clock signal.

22. The method of claim 18 wherein the step of setting the control value of each processing unit comprises:

when a control value of a first processing unit holds a predetermined value for driving a clock-gating unit of the first processing unit to gate the clock signal, and the pipeline control unit outputs the first control signal to the first processing unit, a control value of a processing unit following the first processing unit is set to the predetermined value.

23. The method of claim 18 wherein the step of setting the control value of each processing unit comprises:

when a control value of a first processing unit holds a predetermined value for controlling a clock-gating of the first processing unit not to gate the clock signal, the pipeline control unit outputs the first control signal to the first processing unit, the pipeline control unit does not output the second control signal to the first processing unit, a control value of a processing unit following the first processing unit is set to the predetermined value.

24. The method of claim 14 wherein the pipeline-based circuit is built according to a super-scalar structure.

25. The method of claim 14 wherein the pipeline-based circuit is built according to a super-pipeline structure.

26. The method of claim 14 wherein the pipeline-based circuit is a microprocessor.

27. The method of claim 14 wherein the pipeline-based circuit is a digital signal processor (DSP).

* * * * *